United States Patent
Enns et al.

(10) Patent No.: US 7,647,318 B1
(45) Date of Patent: Jan. 12, 2010

(54) MANAGEMENT INTERFACE HAVING FINE-GRAIN ACCESS CONTROL USING REGULAR EXPRESSIONS

(75) Inventors: Robert P. Enns, Los Gatos, CA (US); Mark E. Trostler, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 498 days.

(21) Appl. No.: 10/628,885

(22) Filed: Jul. 28, 2003

(51) Int. Cl.
  *G06F 17/30* (2006.01)
  *G06F 17/00* (2006.01)
  *G06F 7/00* (2006.01)
(52) U.S. Cl. .......................... 707/6; 707/9; 707/103 R
(58) Field of Classification Search .................. 707/6, 707/9, 103; 709/225, 229
  See application file for complete search history.

(56) References Cited

U.S. PATENT DOCUMENTS

| | | | |
|---|---|---|---|
| 6,243,713 B1 * | 6/2001 | Nelson et al. ............ 707/104.1 |
| 6,446,088 B1 * | 9/2002 | Vaduvur et al. ............ 707/201 |
| 6,973,460 B1 * | 12/2005 | Mitra ..................... 707/103 R |
| 7,284,271 B2 * | 10/2007 | Lucovsky et al. ............ 726/21 |
| 2002/0156879 A1 * | 10/2002 | Delany et al. ............... 709/223 |
| 2004/0260818 A1 * | 12/2004 | Valois et al. ................ 709/229 |

* cited by examiner

*Primary Examiner*—Apu M Mofiz
*Assistant Examiner*—Chelcie Daye
(74) *Attorney, Agent, or Firm*—Shumaker & Sieffert, P.A.

(57) ABSTRACT

Techniques for controlling access to resources within a device are described. A device is described, for example, that includes a computer-readable medium and a management interface. The computer-readable medium stores configuration data and authorization data. The authorization data defines an access control attribute and an associated regular expression specifying a textual pattern. The management interface receives a text-based command to access the configuration data of the device, evaluates the command using the regular expression, and controls access to the configuration data based on the evaluation.

24 Claims, 5 Drawing Sheets

MANAGEMENT INTERFACE HAVING FINE-GRAIN ACCESS CONTROL USING REGULAR EXPRESSIONS

TECHNICAL FIELD

The invention relates to computing devices and, more particularly, to controlling access to configuration data associated with a computing device.

BACKGROUND

A computer network is a collection of interconnected devices that exchange data and share resources. Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

Conventional routers typically provide a mechanism, referred to herein as a management interface, by which authorized clients, such as human system administrators or automated scripts, directly or remotely access and configure "resources" within the router and obtain operational information for those resources. For example, using a management interface, the clients are able to make changes to the present configuration of a router, manage the router's policies and relationships with other routers, configure interface cards of the router, adjust parameters for the supported network protocols, specify the physical components within the routing device, modify the routing information maintained by the router, access software modules executing on the router, and the like. In addition, the management interface provides access to a variety of information relating to the internal resources of the router, including router chassis inventory, system parameters, routing policies, forwarding options, network flow statistics, error logs, user information, and performance metrics.

Most routers provide a form of "coarse-grain" access control in which the internal resources are logically aggregated into groups, often in the form of a configuration hierarchy, and user access is controlled on a per-group basis. For example, one typical implementation is to assign each user an authorization level. When a user attempts to access a resource with the router, the management interface determines whether the user has a sufficient authorization level to access the resource. If the user's authorization level is sufficient, the user is permitted to access, view, or otherwise configure the resource. If not, the management interface denies access.

Another typical implementation is to associate each user with a set of permission bits. Each permission bit is mapped to one of the groups of resources. By setting the permission bits associated with a particular user, the user can be selectively given access to the respective resource groups of the router.

As the complexity of routers continually increases, there has been an increasing need to provide adequate user-level access control to the myriad of resources and information associated with a given router. For example, a typical router within the Internet, such as a router used by an Internet Service Provider, may have hundreds or even thousands of interfaces supporting thousands of different customers. These so called coarse-grain control techniques often do not scale well as they, for example, may require an unworkable number of authorization levels or permission bits. As a result, it is often difficult to adequately provide user-level access control to the numerous resources within a router.

SUMMARY

In general, the invention is directed to techniques for controlling access to resources within a device. As used herein, the term "resource" generally refers to any item within the router that may be managed, viewed, updated or otherwise accessed via a management interface presented by the router. For example, the term resource includes configuration parameters, defined routing and forwarding policies and peer relationships, protocols, firewalls, interfaces, router chassis inventory, system parameters, filters, Quality of Service (QoS) settings, network flow statistics, error logs, user information, and performance metrics the like.

Consistent with the principles of the invention, a management interface of the device supports a class syntax for defining authorization classes for controlling the access rights of remote clients. The class syntax supports a set of attributes, including a permissions attribute that provides coarse-grain access control over groups of resources. The class syntax supports two additional class attributes that may optionally be used in conjunction with the permissions attributes to provide fine-grain access control to the resources. In particular, an allow-configuration attribute and a deny-configuration attribute can be used to provide explicit, fine-grain access control. Each of these attributes can be associated with a respective "regular expression," which generally refers to a formula that is used to match patterns within textual data. The device applies the regular expressions associated with the fine-grain access control class attributes to evaluate text-based commands provided by the clients, and to selectively allow or deny access requests to access configuration data within the device based on the evaluation. The device may apply the regular expressions in real-time to process configuration commands as the clients enter, e.g., type, the commands.

In one embodiment, a method comprises storing authorization data that defines an access control attribute and an associated regular expression specifying a textual pattern, and evaluating the command using the regular expression to determine whether the command matches the textual pattern. The method further comprises controlling access to configuration data of a device based on the evaluation.

In another embodiment, a method comprises storing configuration data for a device, wherein the configuration data is arranged in the form of a multi-level configuration hierarchy having a plurality of objects, each of the objects having a textual label and representing a portion of the configuration data. The method further comprises storing authorization data defining an access control attribute and an associated regular expression defining a textual pattern that identifies a set of one or more of the objects within the configuration hierarchy, applying the regular expression to a command to determine whether the command requests access to any of the objects within the set, and controlling access to configuration data of the device based on the determination.

In another embodiment, a method comprises receiving input defining an access control attribute and an associated regular expression that specifies a textual pattern, and pre-processing the regular expression to automatically insert one or more meta-characters into the regular expression. The method further comprises evaluating a command in real-time using the regular expression as a client enters the command via a command line interface, and controlling access to configuration data of the device based on the evaluation.

In another embodiment, a computer-readable medium contains instructions that cause a programmable processor to store authorization data that defines an access control attribute and an associated regular expression defining a textual pattern, evaluate the command using the regular expression to determine whether the command matches the textual pattern, and control access to configuration data of a device based on the evaluation.

In another embodiment, a device comprises a computer-readable medium and a management interface. The computer-readable medium stores configuration data and authorization data. The authorization data defines an access control attribute and an associated regular expression specifying a textual pattern. The management interface receives a text-based command to access the configuration data, evaluates the command using the regular expression, and controls access to the configuration data based on the evaluation.

In another embodiment, a device comprises a computer-readable medium and a management interface. The computer-readable medium comprises configuration data arranged in the form of a multi-level configuration hierarchy having a plurality of objects, each of the objects having a textual label and representing a portion of the configuration data, and authorization data that defines an access control attribute and an associated regular expression specifying a textual pattern. The textual pattern identifies a set of one or more of the objects within the configuration hierarchy. The management interface applies the regular expression to a command to determine whether the command requests access to any of the objects within the set, and controls access to the configuration data based on the determination.

In another embodiment, a device comprises a computer-readable medium that stores configuration data, and a management interface that receives input defining an access control attribute and an associated regular expression that specifies a textual pattern. The management interface pre-processes the regular expression to automatically insert one or more meta-characters into the regular expression, and stores the access control attribute and the pre-processed regular expression as authorization data to control access to the configuration data.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
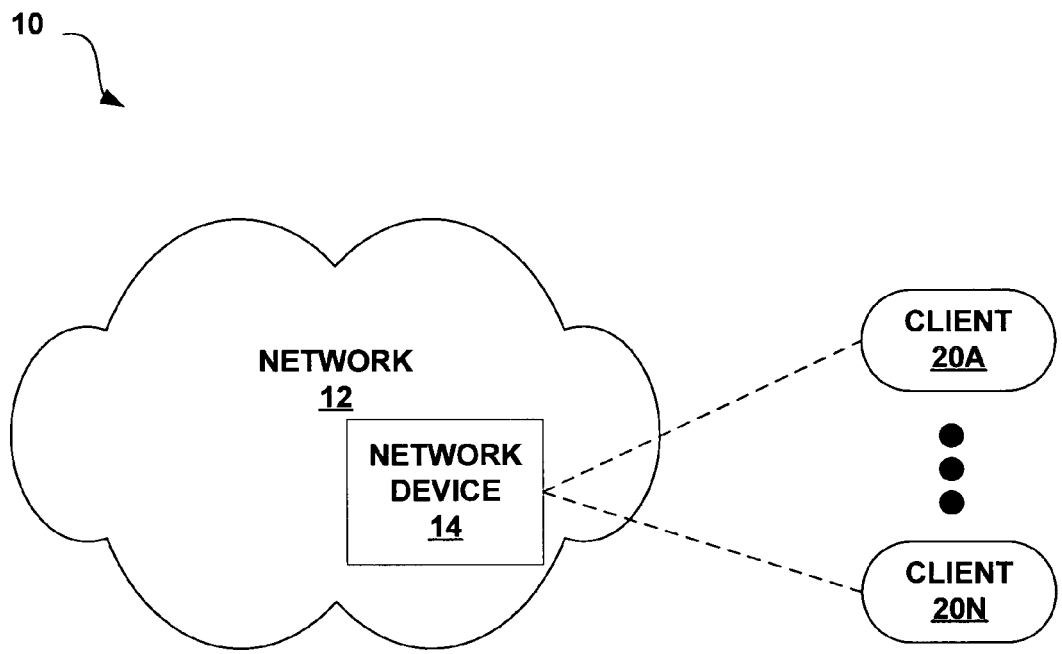
FIG. 1 is a block diagram illustrating an example system in which a network device supports fine-grain access control consistent with the principles of the invention.

FIG. 1 is a block diagram illustrating an example system 10 in which a network 12 includes a network device 14 that supports fine-grain access control consistent with the principles of the invention. Network 10 represents any public or private computer network. Network device 14 represents any device operating within network 10, such as an intelligent hub, switch, router, firewall, gateway, or the like. Although illustrated in reference to a network device, the techniques described herein may readily be applied to any computing device.

Network device 14 presents an interface, referred to as management interface, that allows various clients 20A-20N ("clients 20"), such as human users and automated scripts, to configure network device 14. For example, network device 14 may be a network router, and clients 20 may provide configuration data to configure interface cards of the router, adjust parameters for the supported network protocols, specify the physical components within the router, modify the routing information maintained by the router, access software modules and other resources residing on the router, and the like.

As described in detail, network device 14 supports fine-grain access control using regular expressions. More specifically, network device 14 supports a syntax for defining authorization classes for controlling the access rights of clients 20. The class syntax supports a set of attributes, including a permissions attributes for providing coarse-grain access control. The class syntax supports two additional class attributes that may optionally be used in conjunction with the permissions attribute to provide fine-grain access control. In particular, an allow-configuration attribute and a deny-configuration attribute can be used to provide explicit, fine-grain access control to particular portions of the configuration data maintained by network device 14.

Each of these attributes can be associated with a respective "regular expression," which generally refers to a formula that is used to match patterns within textual data. Network device 14 applies the regular expressions associated with the fine-grain access control class attributes to evaluate text-based commands provided by clients 20, and selectively allows or denies access requests to configuration data with the network device based on the evaluation of the regular expressions and the coarse-grain access control attributes. In one embodiment, network device 14 applies the regular expressions in real-time to process configuration commands from clients 20 as the clients enter, e.g., type, the commands.

Figure 2:
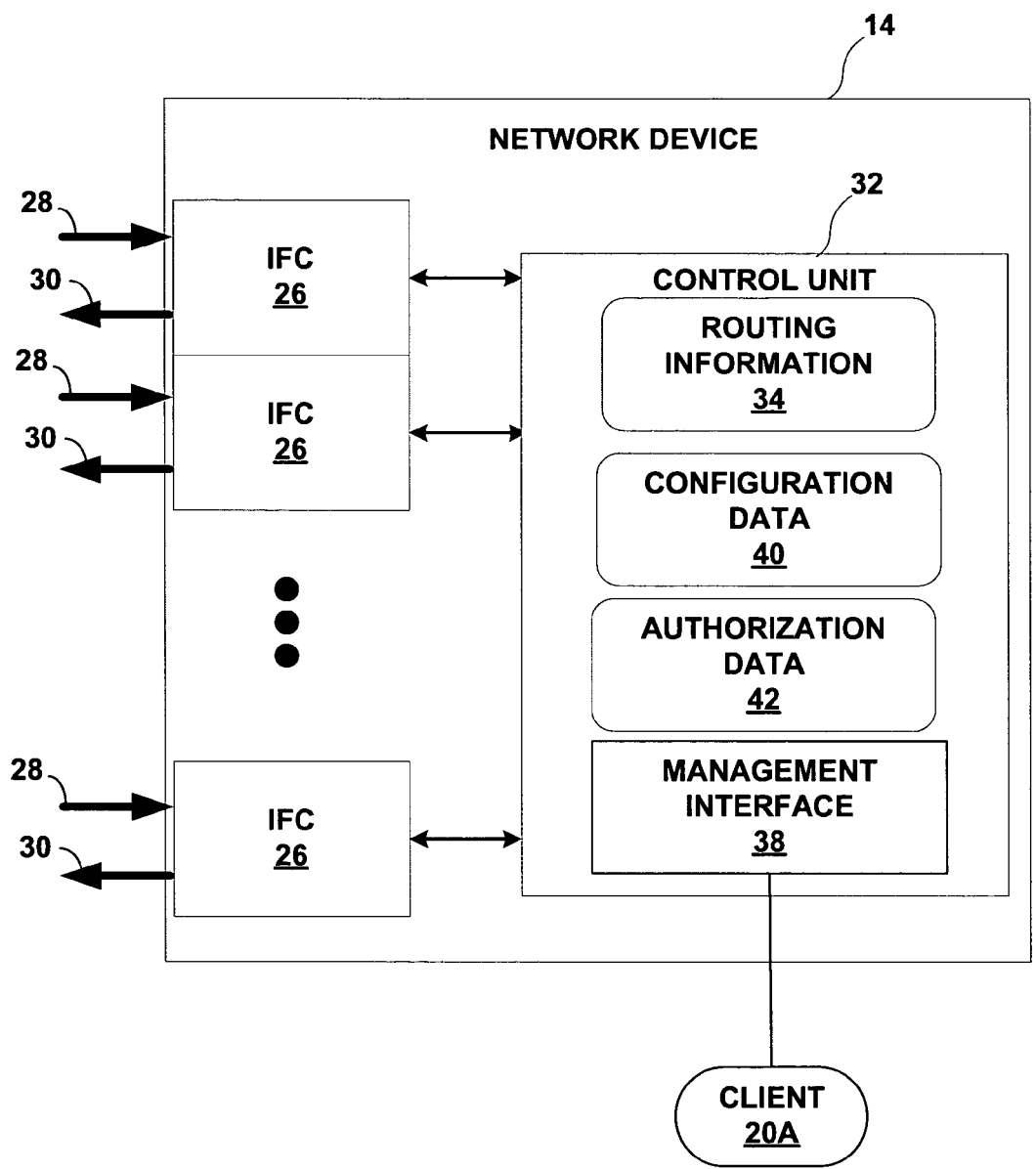
FIG. 2 is a block diagram illustrating an exemplary embodiment in which the network device of FIG. 1 is a network router.

FIG. 2 is a block diagram illustrating an exemplary embodiment in which network device 14 of FIG. 1 comprises a network router. In the illustrated embodiment, network device 14 includes a set of one or more interface cards (IFCs) 26 that receive and send packets via network links 28 and 30, respectively. IFCs 26 are typically coupled to network links 28, 30 via one or more interface ports.

Network device 14 further comprises a control unit 32 that maintains routing information 34. Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Control unit 32 periodically updates routing information 34 to accurately reflect the topology of network 12. In general, control unit 32 receives a packet via inbound network link 28, determines a network destination for the packet, and outputs the packet on an outbound network link 30 based on the determination.

Control unit 32 provides a management interface 38 by which a client, such as client 20A, for example, directly or remotely accesses and configures resources within network device 14 and obtains operational information for those resources. In particular, client 20A may view, modify, or otherwise access configuration data 40, which generally represents any parameters, data, settings, information, and the like, relating to operation of network device 14. For example, configuration data 40 may include system parameters, routing policies, forwarding options, network flow statistics, error logs, user information, router chassis inventory, and performance metrics. By interacting with management interface 38, client 20A is able to access configuration data 40 to manage the router's policies and relationships with other routers, configure IFCs 26, adjust parameters for the supported network protocols, specify the physical components within the routing device, modify the routing information 34, access software modules executing on the router, and the like.

Management interface 38 controls access to configuration data 40 in accordance with authorization data 42, which defines authorization classes in accordance with a class syntax. Each authorization class includes a permissions attributes for providing coarse-grain access control, and optionally includes an allow-configuration attribute and a deny-configuration attribute to provide explicit, fine-grain access control to particular portions of the configuration data 40.

In one embodiment, configuration data 40 is arranged in the form of a multi-level configuration hierarchy having a plurality of inter-related objects. Each object has a textual label, e.g., a name, and represents a portion of configuration data 40 that relates to one or more resources of network device 14. Regular expressions associated with the allow-configuration attribute and deny-configuration attributes provide explicit, fine-grain access control over portions of configuration data 40 by defining textual patterns that match the textual labels of one or more of the objects within the configuration hierarchy. In this manner, the regular expressions associated with the fine-grain access control attributes may specify complex formulas identifying objects at any level of the configuration hierarchy, and are not limited to controlling access to higher-level objects, as are many conventional coarse-grain techniques. Control unit 32 may store configuration data 40 and authorization data 42 on one or more computer-readable media, and in the form of one or more text files, databases, tables, data structures, combinations thereof, or the like.

Management interface 38 may be a command line interface (CLI) or other suitable interface, for processing user or script-driven commands. In other words, management interface may support a command syntax for processing text-based commands entered by client 20A. Upon receiving a command from client 20A, management interface 38 parses the command and updates configuration data 40. During this process, management interface 38 accesses authorization data 42 and prevents client 20A from accessing portions of configuration data 40 for which the client is not authorized. In one embodiment, as described in further detail herein, management interface 38 provides a form of real-time authorization while client 20A is entering the command.

In one embodiment, authorization data 42 is text-based and conforms to a class syntax in which authorization classes can be defined for one or more users. For example, an authorization class may be defined within authorization data 42 to conform to the following class syntax:

class {
      name;
      permissions;
      allow-configuration regexp;
      deny-configuration regexp;
    }

As illustrated, the exemplary class syntax supports a set of attributes. The permissions attribute represents a set of permission bits that are used for coarse-grain access control. In particular, each of bits is associated a high-level object within the hierarchy of configuration data 40, and provides coarse-grain access to the respective portions of the configuration data related to the respective objects.

In addition to the coarse-grain access control provided by the permissions attributes, the class syntax supports two class attributes that may optionally be used in conjunction with the permissions attribute to provide fine-grain access control to portions of configuration data 40. In particular, an allow-configuration attribute can be used to selectively authorize access to portions of configuration data 40 at any level of the configuration hierarchy. Similarly, a deny-configuration attribute can be used to selectively deny access to portions of configuration data 40 at any level of the configuration hierarchy.

The architecture of network device 14 illustrated in FIG. 2 is for exemplary purposes only, and the principles of the invention are not limited to this architecture. Control unit 32 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of network device 14 may be implemented by executing the instructions of the computer-readable medium with one or more processors, discrete hardware circuitry, firmware, software executing on a programmable processor, or a combination of any of the above.

Figure 3:
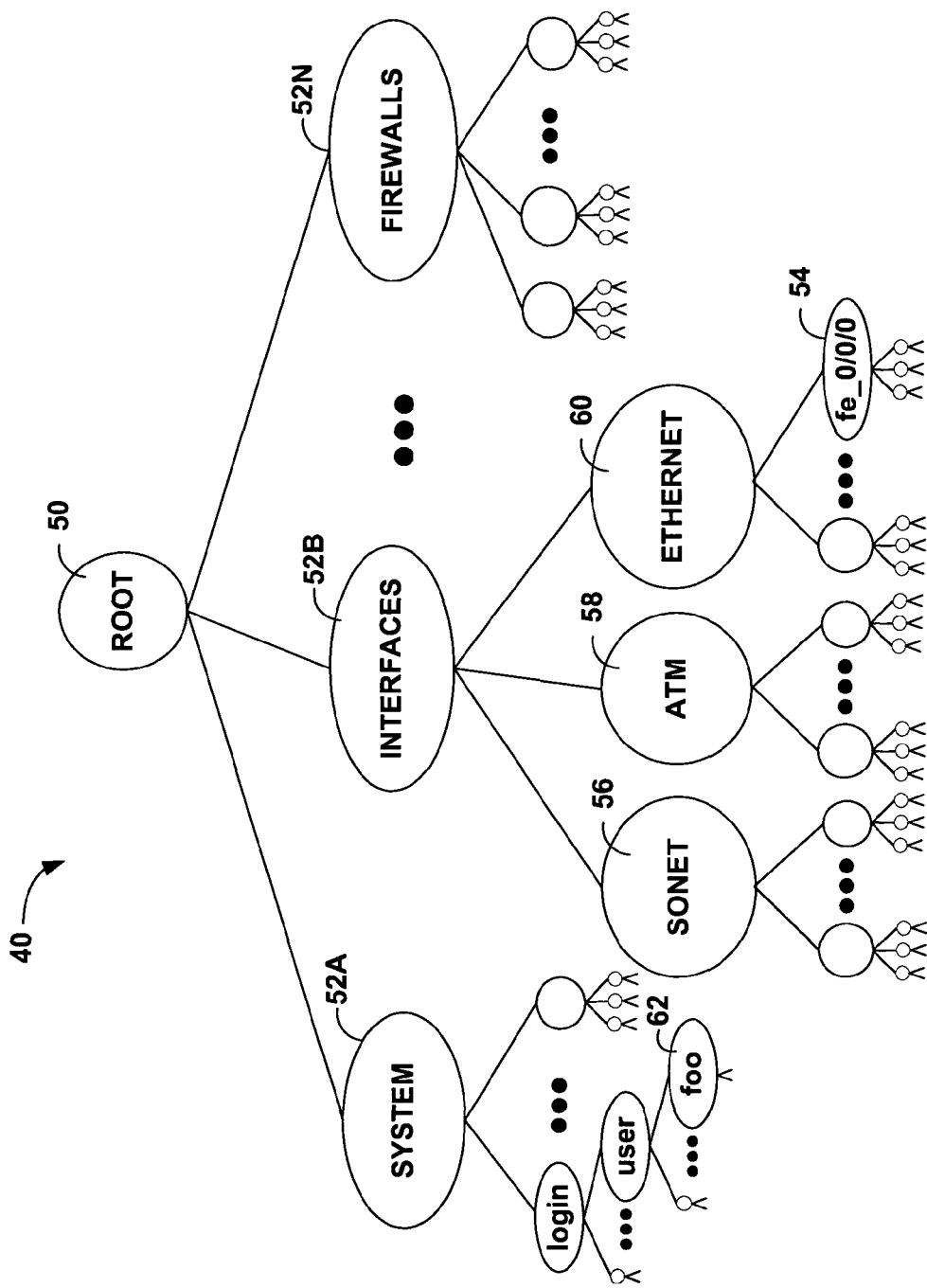
FIG. 3 illustrates an example of configuration data arranged in the form of a multi-level configuration hierarchy having a plurality of inter-related objects.

FIG. 3 illustrates an example of configuration data 40 arranged in the form of a multi-level configuration hierarchy. In this example, configuration data 40 includes a root object 50 and a plurality of child objects 52A-52N ("child objects 52"). For exemplary purposes only three child objects 52 of root object 50 are illustrated: SYSTEM object 52A, FIREWALLS object 52B, and INTERFACES object 52N. As illustrated, each of the child objects 52 have associated textual labels, e.g., "SYSTEM," "FIREWALLS," and "INTERFACES." Each of these child objects 52 in turn have respective child objects dependent therefrom. Depending upon the complexity of network 12 and network device 14, configuration data 40 may be arranged as a hierarchy having numerous levels inter-relating thousands of objects or more.

The following pseudocode illustrates an example authorization class conforming to the above-described class syntax:

class {
      name example-user-class;
      permissions SYSTEM|FIREWALLS;
      allow-configuration "INTERFACES Ethernet fe_0/0/0";
      deny-configuration "SYSTEM login user f.*";
    }

In this example, an authentication class is defined to have a class name of example-user-class. The permissions attribute that provides coarse-grain access control is set to allow users associated with the class to access portions of configuration data 40 associated with the SYSTEM object 52A object and the FIREWALLS object 52N, as well as all lower-level objects depending from these objects in the hierarchy of the configuration data 40. As a result, management interface 38 of network device 14 generally prevents users associated with this exemplary authorization class from accessing other portions of configuration data 40, e.g., the interfaces of the network device that are associated within INTERFACES object 52B and its dependent objects.

Although the users are generally not given coarse-grain-access, the allow-configuration class attribute provides the users with selective authorization to access the portion of configuration data 40 corresponding to the particular Ethernet interface fe_0/0/0 object 54. Consequently, the users are prevented from accessing any portion of configuration data 40 associated with Sonet object 56, ATM object 58, and Ethernet object 60 other than fe_0/0/0 54. With respect to Ethernet interface fe_0/0/0 object 54, the allow-configuration class attribute authorizes the users to access portions of configuration data 40 associated with Ethernet interface fe_0/0/0 object 54 and any lower-level objects dependent therefrom.

The permissions attribute grants coarse-grain access rights to the users for all portion of configuration data 40 related to SYSTEM object 52A, e.g., system parameters, user information, and the like. The deny-configuration attribute, however, instructs management interface 38 to selectively deny access to those portions of configuration data 40 that any object having a textual label that matches the regular expression "SYSTEM login user f.*," e.g., the portion of configuration data 40 associated with foo object 62. In other words, users associated with the example authorization class are allowed to access all system-related portions of configuration data 40, but specifically denied access object having a textual label that matches the regular expression "SYSTEM login user f.*."

Figure 4:
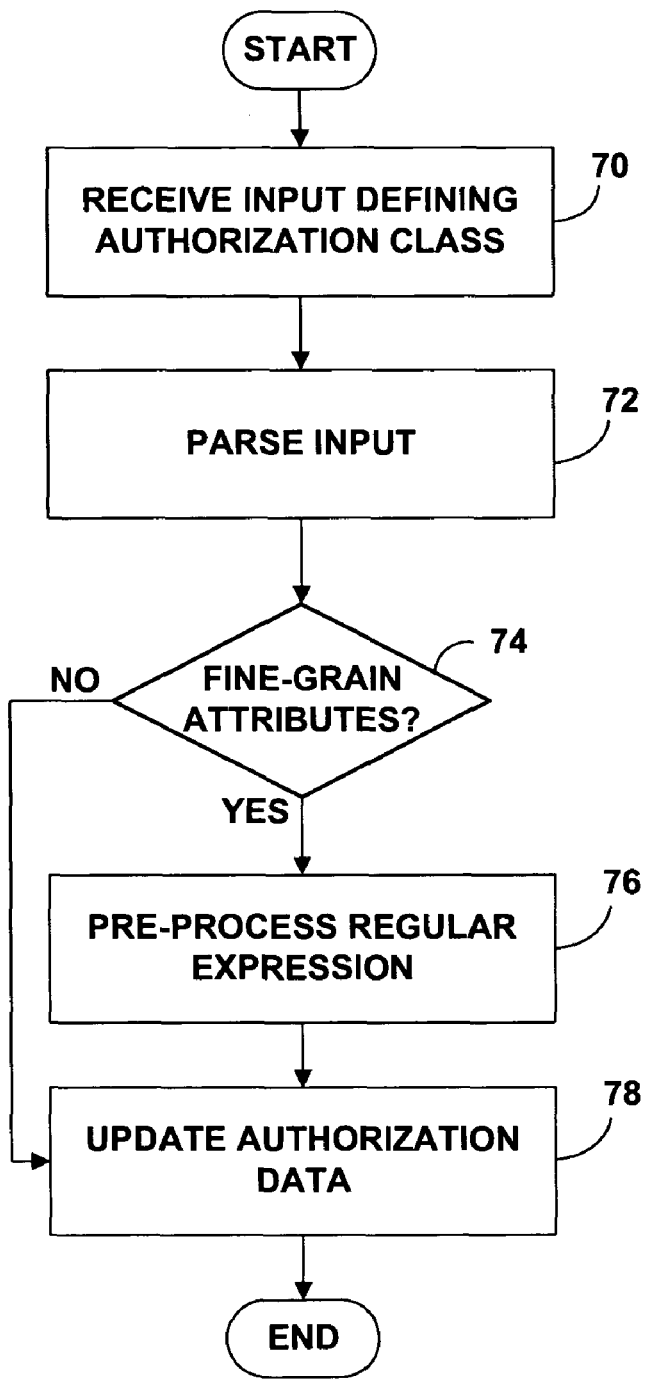
FIG. 4 is a flowchart illustrating operation of the network device when interacting with a client to define an authorization class having fine-grain access control attributes.

FIG. 4 is a flowchart illustrating operation of network device 14 when interacting with client 20A to define an authorization class having fine-grain access control attributes. Initially, management interface 38 receives input defining an authorization class, including coarse-grain access control and optionally fine-grain access control attributes (70). Specifically, client 20A accesses authorization information 42 via management interface 38 and defines an authorization class, such as the exemplary authorization class example-user-class described above.

In response, management interface 38 parses the input (72) and determines whether fine-grain access control attributes, i.e., allow-configuration and deny-configuration, are defined within the authorization class (74). If no fine-grain access control attributes are defined within the class, management interface 38 updates authorization data 42 to store the defined authorization class (78).

If either of the allow-configuration and deny-configuration fine-grain access control attributes are included within the class, management interface 38 pre-processes the associated regular expressions provided by the user (76). For example, in reference to the exemplary authorization class described above, management interface 38 preprocesses the regular expressions "INTERFACES Ethernet fe_0/0/0" and "SYSTEM login user f.*." In particular, management interface 38 pre-processes the regular expressions to automatically insert meta-characters to ensure the regular expressions are correctly formulated in view of the hierarchical arrangement of configuration data 40.

As described above, the term "regular expression" generally refers to a formula that is used to match patterns within textual data. The formula is text-based and includes regular characters and "meta-characters." Regular characters include upper and lower case letters and digits. The meta-characters have special meanings, and are used to create powerful pattern matching formulas. In general, regular expressions are used to evaluate textual data, i.e., by applying the formula to the data and returning a binary value of true or false. More specifically, the regular expression returns a true when the regular expression matches a pattern within the textual data. Otherwise, the regular expression returns a false. For purposes of illustration, Table 1 provides an overview of meta-characters that are commonly supported by various implementations of regular expressions.

TABLE 1

| Meta-character | Description |
| --- | --- |
| . | Matches any single character. |
| $ | Matches the end of a line. |
| ^ | Matches the beginning of a line. |
| * | Matches zero or more occurrences of the character immediately preceding. |
| \ | Used as a quoting character to treat a subsequent character as an ordinary character and not a meta-character. |
| [ ] [C1-C2] [^C1-C2] | Matches any one of the characters between the brackets. |
| \| | Or two conditions together. |
| + | Matches one or more occurrences of the character or regular expression immediately preceding. |
| ? | Matches 0 or 1 occurrences of the character or regular expression immediately preceding. |

Management interface 38 applies the regular expressions associated with fine-grain control attributes to evaluate text-based commands to selectively allow or deny access to portion of configuration data 42. Management interface 38 pre-processes the regular expressions to automatically insert meta-characters to ensure the regular expressions are correctly formulated in view of configuration data 40. In one embodiment, as described in more detail below, management interface 38 pre-processes the regular expressions to support real-time, fine-grain access control while client 20A enters a command. In this embodiment, management interface 38 applies the regular expressions each time client 20A enters a space or other token indicating a textual break within a command line to determine whether the client has authorization to access the portion of configuration data 40 being described by the command line.

For the allow-configuration attribute, management interface 38 pre-processes the associated regular expression to allow client 20A to enter commands reciting each level of the configuration hierarchy from root object 50 to the specifically allowed object. For example, management interface 38 pre-processes the regular expression "INTERFACES Ethernet fe_0/0/0" to a more explicit regular expression "^INTERFACE|^INTERFACES Ethernet|^INTERFACES Ethernet fe_0/0/0". In this example, management interface 38 has pre-processed the regular expression and inserted meta-characters based on the hierarchical arrangement of configuration data 40. As a result, management interface 38 may apply the regular expression in real-time as the user enters, e.g., types, a command.

Consequently, the user is allowed to enter any of the following commands:

>show interfaces
>show interfaces Ethernet
>show interfaces Ethernet fe_0/0/0 each of which cause management interface 38 to display only that portion of configuration data 40 relating the Ethernet interface fe_0/0/0. By applying the pre-processes regular expression "^INTERFACES|^INTERFACES Ethernet|^INTERFACES Ethernet fe_0/0/0" at each space while the command is typed, management interface 38 prevents the user from entering a command that would otherwise result in access of a portion of configuration data 40 for which the user is not authorized.

For example, upon pressing the space key after entering "ATM" in the following command, management interface 38 automatically prevents the user entering further text or submitting the command:
>show interfaces ATM
ACCESS DENIED Management interface 38 may display an indicator, such as "ACCESS DENIED" as illustrated above, and/or may automatically remove the portion of the text that is not explicitly allowed by the regular expression, e.g., "ATM."

As another example, upon the user entering a "?" after entering a portion of a command, management interface 38 automatically presents a list of objects that are accessible by the user and that may be used to complete the command. For example, in response to the following command:
>show interfaces ?

management interface 38 displays a list that includes "Ethernet" as a permissible entry, and does not include other interface objects that are not accessible, e.g., Sonet object 56 and ATM object 58. In this manner, management interface 38 restricts completion of the command by selection of textual labels associated with only those objects that are accessible via the user.

As another example, if the user enters a show command, management interface 38 automatically displays only those portions of configuration data 40 to which the user has access. In this example, in response to a show command, management interface 38 displays those portions of configuration data 40 that relate to SYSTEM object 52A including all dependent objects except for dependent foo object 62 for which access has been explicitly denied. In addition, management interface 38 displays no portion of configuration data 40 related to INTERFACES object 52B or objects dependent therefrom, except for portions of configuration data 40 relating to fe_0/0/0 object 54 for which access has been explicitly allowed.

For the deny-configuration attribute, management interface 38 pre-processes the regular expression "SYSTEM login user f.*" to produce a more explicit regular expression "^SYSTEM login user f.*$". Assuming the user has been given coarse-grain access to SYSTEM configuration data, management interface 38 need only apply the regular expression to pattern match for the explicitly denied commands.

Management interface 38 may pre-process the regular expressions of the authorization class using these or other techniques depending upon the arrangement of configuration data 40. After pre-processing the regular expressions, management interface 38 updates authorization data 42 to store the defined authorization class (78).

Figure 5:
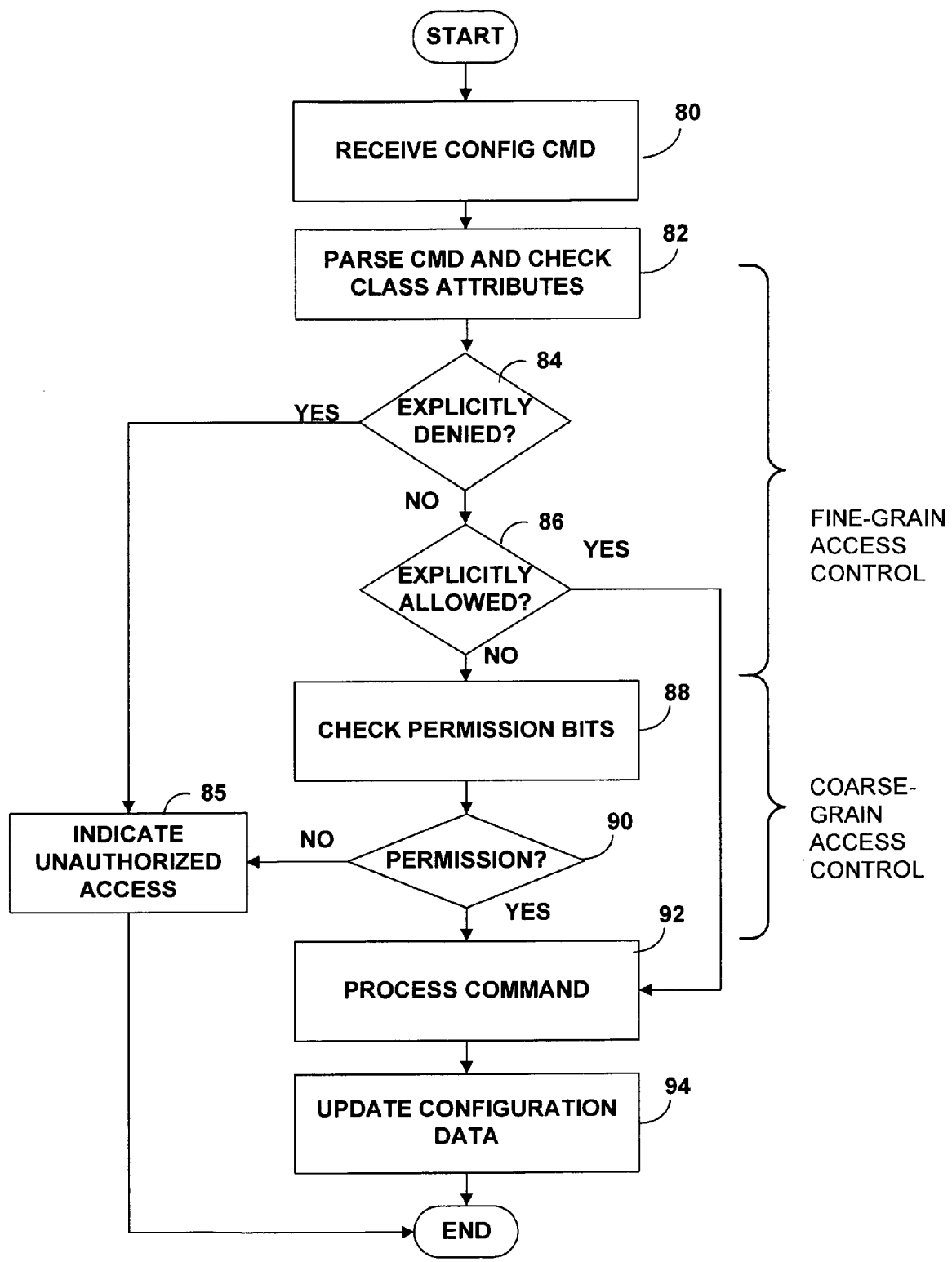
FIG. 5 is a flowchart illustrating operation of the network device in applying the authorization class to provide access control to configuration data.

FIG. 5 is a flowchart illustrating operation of network device 14 in applying the authorization class to provide access control to configuration data 40 consistent with the principles of the invention. Management interface 38 may apply the process of FIG. 5 upon receiving an entire command line from client 20A, or may apply the process in real-time as client 20A enters the command.

Initially, client 20A provides a command requesting access to a portion of configuration data 40 (80). In response, management interface 38 parses the command and invokes the authorization class associated with client 20A to determine whether fine-grain attributes have been defined (82).

If the authorization class includes a deny-configuration attribute, management interface 38 applies the associated regular expression to the command supplied by client 20A to determine whether access to the portion of configuration data 40 described by the command is explicitly denied (84). In particular, management interface 38 applies the regular expression to the command to determine whether a match exists between the command and the textual pattern defined by the regular expression. If so, management interface 38 indicates the unauthorized access to client 20A, and rejects all or portions of the command (85).

If the authorization class has not specifically denied access to the portion of configuration data 40 described by the command, management interface 38 similarly applies the regular express associated with the allow-configuration class attribute, if any, to determine whether client 20A has been explicitly given access to the portion of configuration data 40 described by the command (86).

If explicit authorization has been given, and the command has been submitted by client 20A, management interface 38 allows the client to proceed with the command and, when complete, processes the command (92) to display or update the accessed portion of configuration data 40 (94). If, however, explicit authorization has neither been denied or allowed via the fine-grain access control attributes, management interface 38 accesses the coarse-grain access control permissions attribute of the authorization class (88) to determine whether client 20A has been given broad authorization to access portions of configuration data 40 that encompass the specific portion being requested by the client (90). For example, in response to the following command,
>show system login user foo management interface 38 determines whether the coarse-grain access control permissions attribute has been set to authorize client 20A to access portions of configuration data 40 associated with SYSTEM object 52A (FIG. 3) as well as all lower-level objects depending from these objects in the hierarchy of the configuration data 40. If so, management interface 38 processes the command (92). Otherwise, management interface 38 indicates the unauthorized access to client 20A, and rejects all or portions of the command (85).

Various embodiments of the invention have been described. These and other embodiments are within the scope of the following claims.

The invention claimed is:
1. A method for controlling access to a resource of a device, the method comprising:
   storing, within a device, authorization data that defines at least one class of clients that access the device, wherein the authorization data defines for each class of clients: (i) an access control attribute that specifies coarse-grain access control rights for members of the class to configuration data for a resource provided by the device, and (ii) an associated regular expression specifying a textual pattern that specifies fine-grain access control rights for the members of the class to only a portion of the configuration data for the resource provided by the device:
   receiving, with the device, a command from a client, wherein the command requests access to the portion of the configuration data for the resource of the device;
   identifying the class of which the client is a member;
   retrieving, from the authorization data, both the access control attribute and the regular expression for the identified class of which the client is a member;

evaluating the command using the retrieved regular expression to determine whether the command matches the textual pattern specified by the retrieved regular expression; and controlling access to the portion of the configuration data requested by the client based on both: (i) the coarse-grain access control rights to the configuration data of the resource specified by the access control attribute for the identified class of which the client is a members and (ii) the evaluation of the regular expression for that class, wherein controlling access comprises allowing access to the configuration data when the access control attribute denies access to the resource and the textual pattern of the regular expression matches the command, and wherein controlling access comprises denying access to the configuration data when the access control attribute grants access to the resource and the textual pattern of the regular expression matches the command.

2. The method of claim 1, wherein storing authorization data comprises storing the authorization data as an authorization class that conforms to a class syntax.

3. The method of claim 1, wherein the coarse-grain access control attribute comprises a set of permission bits, and each of the permission bits is associated with a respective group of the resources within the network device.

4. The method of claim 1, further comprising receiving the command from the client via a command line interface.

5. The method of claim 4, wherein evaluating the command comprises evaluating the command in real-time while the client inputs the command via the command line interface.

6. A method comprising:

storing, within a device, configuration data for one or more resources provided by the device, wherein the configuration data is arranged in the form of a multi-level configuration hierarchy having a plurality of higher-level objects and a plurality of lower-level objects, and each of the higher-level objects represents a portion of the configuration data that relates to a respective one of the resources of the device;

storing, within the device, authorization data that defines at least one class of clients that access the device, wherein the authorization data defines for each class of clients: (i) an access control attribute that specifies coarse-grain access control rights for members of the class to the configuration data for the resource, and (ii) an associated regular expression specifying a textual pattern that specifies fine-grain access control rights for the members of the class to only a portion of the configuration data for the resource;

receiving, with the device, a command from a client, wherein the command requests access to one or more of the lower-level objects of the configuration data for a particular one the resources of the device;

identifying the class of which the client is a member;

retrieving, from the authorization data, both the access control attribute and the regular expression for the identified class of which the client is a member;

evaluating the command using the retrieved regular expression to determine whether the command matches the textual pattern specified by the retrieved regular expression; and controlling access to the one or more lower-level objects of the configuration data requested by the client based on both: (i) the coarse-grain access control rights for the higher-level object of the configuration data for the requested resource as specified by the access control attribute for the identified class of which the client is a member, and (ii) the evaluation of the regular expression for that class with respect to the requested one or more lower-level objects of the resource, wherein controlling access comprises allowing access to the configuration data when the access control attribute denies access to the resource and the textual pattern of the regular expression matches the command, and wherein controlling access comprises denying access to the configuration data when the access control attribute grants access to the resource and the textual pattern of the regular expression matches the command.

7. The method of claim 6, wherein the objects have respective textual labels and the regular expression defines the textual pattern to match the textual labels of a set of one or more of the objects within the configuration hierarchy.

8. The method of claim 7, wherein evaluating the command comprises applying the regular expression to the command to determine whether the command specifies any of the objects within the set.

9. The method of claim 6, further comprising pre-processing the regular expression to automatically insert one or more meta-characters into the regular expression based on the hierarchical arrangement of the configuration data.

10. The method of claim 6, further comprising pre-processing the regular expression so that the command is evaluated with the regular expression in real-time as the client enters the command.

11. The method of claim 10, wherein evaluating the command comprises evaluating the command with the pre-processed regular expression each time the client enters a token indicating a textual break within the command.

12. The method of claim 1, wherein controlling access comprises controlling access to configuration data of a router.

13. A computer-readable medium comprising instructions for causing a programmable processor to:

store, within a device, authorization data that defines at least one class of clients that access the device, wherein the authorization data defines for each class of clients an access control attribute and an associated regular expression defining a textual pattern, and further wherein the access control attribute is a coarse-grain access control attribute defining access control rights to a resource provided by the device and the regular expression defines fine-grain access control rights for members of the class to a portion of the resource provided by the device;

receive, with the device, the command from a client, wherein the command requests access to configuration data of the device;

identify the class of which the client is a member;

retrieve, from the authorization data, the access control attribute and the regular expression for the identified class of which the client is a member;

evaluate the command using the retrieved regular expression to determine whether the command matches the textual pattern specified by the retrieved regular expression; and control access to the configuration data by the client based on the coarse-grain access control attribute for the identified class of which the client is a member and the evaluation of the regular expression for that class, wherein the instructions cause the processor to allow access to the configuration data when the textual pattern of the regular expression matches the command, and wherein the instructions cause the programmable processor to deny access to the configuration data when the textual pattern of the regular expression matches the command.

14. The computer-readable medium of claim 13, wherein the coarse-grain access control attribute comprises a set of permission bits, and each of the permission bits is associated with a respective group of the resources.

15. The computer-readable medium of claim 13, further comprising instructions to cause the programmable processor to receive the command from the client via a command line interface.

16. The computer-readable medium of claim 15, further comprising instructions to cause the programmable processor to evaluate the command in real-time while the client inputs the command via the command line interface.

17. The computer-readable medium of claim 13, wherein the configuration data is arranged in the form of a multi-level configuration hierarchy having a plurality of objects, and each of the objects represents a portion of the configuration data that relates to one or more resources of the device.

18. The computer-readable medium of claim 17, wherein the objects have respective textual labels and the regular expression defines the textual pattern to match the textual labels of a set of one or more of the objects within the configuration hierarchy.

19. The computer-readable medium of claim 18, wherein further comprising instructions to cause the programmable processor to apply the regular expression to the command to determine whether the command specifies any of the objects within the set.

20. The computer-readable medium of claim 17, further comprising instructions to cause the programmable processor to pre-process the regular expression to automatically insert one or more meta-characters into the regular expression based on the hierarchical arrangement of the configuration data.

21. The computer-readable medium of claim 17, further comprising instructions to cause the programmable processor to receive the command from a client via a command line interlace, and pre-process the regular expression so that the command is evaluated with the regular expression in real-time as the client enters the command.

22. The computer-readable medium of claim 21, further comprising instructions to cause the programmable processor to evaluate the command with the pre-processed regular expression each time the client enters a token indicating a textual break within the command.

23. The computer-readable medium of claim 13, further comprising instructions to cause the programmable processor to control access to configuration data of a router.

24. The method of claim 1, wherein a resource is at least one of a present configuration of the device, policies and relationships with other devices, a configuration of an interface card of the device, a parameter for network protocols supported by the device, a specification for a physical component within the device, information maintained by the device, a software module executing on the device, device chassis inventory, device system parameters, routing policies, forwarding options, network flow statistics, error logs, user information, or performance metrics.

* * * * *

UNITED STATES PATENT AND TRADEMARK OFFICE
CERTIFICATE OF CORRECTION

PATENT NO. : 7,647,318 B1  
APPLICATION NO. : 10/628885  
DATED : January 12, 2010  
INVENTOR(S) : Enns et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this

Sixteenth Day of November, 2010

David J. Kappos  
*Director of the United States Patent and Trademark Office*